United States Patent
Aronov et al.

(10) Patent No.: US 8,599,522 B2
(45) Date of Patent: Dec. 3, 2013

(54) CIRCUIT INTERRUPTER WITH IMPROVED SURGE SUPPRESSION

(75) Inventors: Aleksandr Aronov, Brooklyn, NY (US); Michael Ostrovsky, Brooklyn, NY (US); John LiBretto, Massapequa, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 13/194,386

(22) Filed: Jul. 29, 2011

(65) Prior Publication Data

US 2013/0027819 A1    Jan. 31, 2013

(51) Int. Cl.
| | | |
|---|---|---|
| H02H 3/00 | (2006.01) | |
| H02H 9/08 | (2006.01) | |
| H02H 3/22 | (2006.01) | |
| H02H 1/00 | (2006.01) | |
| H02H 1/04 | (2006.01) | |

(52) U.S. Cl.
USPC .............................. 361/42; 361/111; 361/118

(58) Field of Classification Search
USPC .......................................................... 361/42
See application file for complete search history.

(56) References Cited

U.S. PATENT DOCUMENTS

| | | | |
|---|---|---|---|
| 3,611,044 A | 10/1971 | Osterhout et al. | |
| 3,733,520 A | 5/1973 | Schei | |
| 4,174,530 A | 11/1979 | Kresge et al. | |
| 4,240,124 A | 12/1980 | Westrom | |
| 4,400,754 A | 8/1983 | Schweickardt | |
| 4,472,754 A | 9/1984 | Mizukoshi et al. | |
| 4,520,239 A | 5/1985 | Schwartz | |
| 4,685,634 A | 8/1987 | Schwartz | |
| 4,705,342 A | 11/1987 | Schwartz | |
| 4,726,991 A | 2/1988 | Hyatt et al. | |
| 4,869,688 A | 9/1989 | Merio | |
| 4,908,730 A | 3/1990 | Westrom | |
| 5,208,723 A | 5/1993 | Jenne | |
| 5,210,676 A | 5/1993 | Mashikian | |
| 5,233,498 A | 8/1993 | Kansala | |
| 5,383,085 A | 1/1995 | Boy et al. | |
| 5,394,374 A | 2/1995 | Ishimura et al. | |
| 5,559,663 A | 9/1996 | Tanaka et al. | |
| 5,594,613 A | 1/1997 | Woodworth et al. | |

(Continued)

FOREIGN PATENT DOCUMENTS

EP    0186939 A2    7/1986

OTHER PUBLICATIONS

PCT International Search Report and Written Opinion dated Jan. 23, 2013 for PCT/US2012/027094.

(Continued)

*Primary Examiner* — Dharti Patel
(74) *Attorney, Agent, or Firm* — Carter, DeLuca, Farrell & Schmidt, LLP (57) ABSTRACT

A circuit interrupter, such as a GFCI or AFCI product, is provided having a suppression and protection circuit and circuit interrupter circuitry. In one configuration, a semiconductor device and a voltage clamping device or surge protector, such as a metal oxide varistor (MOV), are utilized in the circuit interrupter for handling transient surges and overvoltage conditions. The semiconductor device, such as a SIDCA and a TVS diode, is connected to a solenoid or trip coil of the circuit interrupter circuitry to limit the amount of current through the semiconductor device. The MOV is placed between phase and neutral conductors of the circuit interrupter circuitry.

38 Claims, 4 Drawing Sheets

(56) References Cited

U.S. PATENT DOCUMENTS

| | | |
|---|---|---|
| 5,596,308 A | 1/1997 | Bock |
| 5,617,288 A | 4/1997 | Zaretsky |
| 5,654,857 A | 8/1997 | Gershen |
| 5,781,393 A | 7/1998 | Tabib-Azar et al. |
| 5,786,974 A | 7/1998 | Zaretsky |
| 5,892,669 A | 4/1999 | Shin |
| 5,901,027 A | 5/1999 | Ziegler et al. |
| 6,040,967 A | 3/2000 | DiSalvo |
| 6,069,781 A | 5/2000 | Wingate et al. |
| 6,088,205 A | 7/2000 | Neiger |
| 6,094,128 A | 7/2000 | Bennett et al. |
| 6,118,639 A | 9/2000 | Goldstein |
| 6,128,169 A | 10/2000 | Neiger |
| 6,160,692 A | 12/2000 | Zaretsky |
| 6,172,865 B1 | 1/2001 | Boy et al. |
| 6,211,770 B1 | 4/2001 | Coyle |
| 6,246,558 B1 | 6/2001 | DiSalvo et al. |
| 6,252,488 B1 | 6/2001 | Ziegler et al. |
| 6,282,070 B1 | 8/2001 | Ziegler et al. |
| 6,342,998 B1 | 1/2002 | Bencivenga et al. |
| 6,421,218 B1 | 7/2002 | Vo et al. |
| 6,437,700 B1 | 8/2002 | Herzfeld et al. |
| 6,462,318 B2 | 10/2002 | Furuuchi et al. |
| 6,556,395 B1 * | 4/2003 | Chan et al. ............ 361/42 |
| 6,606,232 B1 | 8/2003 | Vo et al. |
| 6,608,547 B1 | 8/2003 | Grier et al. |
| 6,636,403 B2 | 10/2003 | McLoughlin et al. |
| 6,671,150 B2 * | 12/2003 | Elms et al. ............ 361/91.1 |
| 6,692,270 B2 | 2/2004 | Bencivenga et al. |
| 6,693,779 B2 | 2/2004 | DiSalvo |
| 6,717,782 B2 | 4/2004 | Disalvo et al. |
| 6,900,972 B1 | 5/2005 | Chan et al. |
| 7,012,500 B2 | 3/2006 | Chan et al. |
| 7,031,125 B2 | 4/2006 | Germain et al. |
| 7,049,910 B2 | 5/2006 | Campolo et al. |
| 7,082,021 B2 | 7/2006 | Chan et al. |
| 7,161,786 B2 | 1/2007 | Bencivenga et al. |
| 7,187,526 B2 | 3/2007 | Disalvo |
| 7,242,566 B2 | 7/2007 | Yegiin et al. |
| 7,283,340 B1 | 10/2007 | Finlay, Sr. et al. |
| 7,692,904 B2 * | 4/2010 | Li et al. ............ 361/45 |
| 7,697,252 B2 | 4/2010 | Chan |
| 7,719,804 B1 | 5/2010 | Morgan et al. |
| 2001/0015686 A1 | 8/2001 | McLoughlin |
| 2001/0055187 A1 | 12/2001 | Mcloughlin et al. |
| 2002/0135957 A1 * | 9/2002 | Chan et al. ............ 361/42 |

OTHER PUBLICATIONS

"Health Care Facilities Wiring Device Products Bulletin", Leviton Mfg., Co., Inc., pub Jul. 2006, 24 pgs.

"Power Quality Products", Leviton Mfg. Co., Inc., pub. 2003, 16 pgs, no month.

"Technical and Applications Manual for Power Quality Products", Leviton Mfg. Co., Inc., pub. 2003, 66 pgs, no month.

"Metal Oxide Varistor Degradation", Leviton Mfg. Co., Inc., pub. Mar. 2004, 7 pgs.

"Multimedia Residential Surge Protector Panel", Leviton Mfg. Co., Inc., Product Bulletin for Catalog No. 5111-PTC & 51110-CT8, pub. in 2003, 2 pgs, no month.

"Leviton's New Uninterruptible Power Supply (UPS) 'Strip' Models", Leviton Mfg. Co, Inc., Product Bulletin for Catalog Nos. U0330-KO, U0500-SKO, pub. in 2000, 2 pgs, no month.

* cited by examiner

CIRCUIT INTERRUPTER WITH IMPROVED SURGE SUPPRESSION

CROSS-REFERENCE TO RELATED APPLICATIONS

This application is related to commonly owned application Ser. No. 11/079,557, filed Mar. 14, 2005, now U.S. Pat. No. 7,082,021, entitled Circuit Interrupter with Improved Surge Suppression, which is a continuation of application Ser. No. 09/829,339, filed Apr. 9, 2001, now U.S. Pat. No. 6,900,972, both of which are incorporated herein in their entirety by reference. This application is also related to the patent applications which are related to U.S. Pat. No. 7,082,021 and identified therein. These applications are the following:

This application is related to commonly owned application Ser. No. 09/812,288, filed Mar. 20, 2001, now U.S. Pat. No. 7,049,910, entitled Circuit Interrupting Device with Reset Lockout and Reverse Wiring Protection and Method of Manufacture, which is a continuation-in-part of application Ser. No. 09/379,138 filed Aug. 20, 1999, now U.S. Pat. No. 6,246,558, which is a continuation-in-part of application Ser. No. 09/369,759 filed Aug. 6, 1999, now U.S. Pat. No. 6,282,070, which is a continuation-in-part of application Ser. No. 09/138,955, filed Aug. 24, 1998, now U.S. Pat. No. 6,040,967, all of which are incorporated herein in their entirety by reference.

This application is related to commonly owned application Ser. No. 09/812,875, filed Mar. 20, 2001, now U.S. Pat. No. 7,031,125, entitled Reset Lockout for Sliding Latch GFCI, which is a continuation-in-part of application Ser. No. 09/688,481 filed Oct. 16, 2000, now U.S. Pat. No. 6,437,700, both of which are incorporated herein in their entirety by reference.

This application is related to commonly owned application Ser. No. 09/813,683, filed Mar. 21, 2001, now U.S. Pat. No. 6,693,779, entitled IDCI With Reset Lockout and Independent Trip, herein incorporated in its entirety by reference.

This application is related to commonly owned application Ser. No. 09/812,601, filed Mar. 20, 2001, now abandoned, entitled Neutral Switch Test Mechanism for a Circuit Interrupter, herein incorporated in its entirety by reference.

FIELD OF THE INVENTION

The present invention relates to surge suppression, and in particular to circuit interrupters, such as ground fault circuit interrupters (GFCI), arc fault circuit interrupters (AFCI) and related products with enhanced transient suppression and protection characteristics.

BACKGROUND OF THE INVENTION

Circuit interrupters, such as GFCI and AFCI, are electronic devices connected to power lines. They require having protection against surges known to "travel" in power lines. UL 943 standard for GFCIs and UL 1699 for AFCIs require these devices to pass unwanted tripping tests for combination waveform and surge immunity tests at levels of 2 kV (1 kA), 4 kV (2 kA) and 6 kV (3 kA).

To protect circuit interrupting electronic devices against the power line surge, it is commonly known to use MOV (metal oxide varistors) devices. MOV devices are capable of clamping voltage at a predetermined level and dissipating surge energy up to another predetermined level.

Known circuit interrupting products typically include an MOV positioned across the power lines of the circuit interrupting product, with the MOV providing some surge protection to the circuit interrupting product circuitry by clamping transient voltages to acceptable levels.

An MOV is typically a non-linear resistance that has a very high resistance below its threshold voltage and is typically modeled as an open circuit. At voltages above the threshold voltage, the resistance is nearly zero and the voltage above the threshold is dissipated. The amount of energy that an MOV dissipates is generally related to the size of the device, typically a disc or 9, 10, 14, 20, or 40 mm or the like. A larger MOV typically dissipates more energy, but takes up more space, may be more costly and may require more open space around the device.

The nature of the clamping and the amount of energy that may be dissipated is determined by the size of the disc and voltage rating associated with a disc type MOV. Heretofore, GFCI/AFCI and other circuit interrupting products have typically been limited to handling transient voltages of 6 kV at 3000 A.

When overvoltage conditions occur, protection components such as the MOV in the typical GFCI and AFCI may not survive, if they are selected to only operate under 120V conditions. For example, a MOV in the typical GFCI operating beyond its rating at overvoltage may disintegrate, and thus such conditions may also destroy the rest of the electronics in the GFCI product and possibly cause a fire. Furthermore, an MOV may fail by rupturing, exploding or igniting. Such failure conditions are potentially dangerous.

Due to the requirements of circuit protection products withstanding abnormal overvoltage conditions, 120V devices cannot use MOV rated below 230V-240V. In the event of surge pulses, such devices cannot clamp voltage fast enough so the peak voltage during surge can reach 600V-800V which may cause electronic components of the devices to malfunction or the device may trip which is undesired. For this reason, additional protection is needed to better protect GFCI/AFCI and other circuit interrupting devices and satisfy UL standard requirements.

SUMMARY OF THE INVENTION

Accordingly, in view of the discussion above, there exists a need for a surge protection circuit which allows components such as a surge protector or voltage clamping device to survive power conditions exceeding voltage and current ratings, and thus enabling a circuit interrupting product, such as a ground fault circuit interrupter (GFCI) or arc fault circuit interrupter (AFCI) product to survive overvoltage conditions.

A suppression and protection circuit is used in conjunction with circuit interrupter circuitry, such as circuitry in a GFCI or AFCI product. In embodiments described herein, a surge protector or voltage clamping device, such as a metal oxide varistor (MOV), is utilized in the circuit interrupting product for handling transient surges and overvoltage conditions. In embodiments described herein, the circuit interrupting product further includes the use of a semiconductor protection device in addition to MOV.

In embodiments described herein, the semiconductor device is preferably either a TVS diode or a SIDAC (Silicon Diode for Alternating Current) marketed, for example, under the names SIDACtor, Transil or TSPD. To work properly these semiconductor devices (in difference to MOV) require to be in series with a current limiting component to limit possible current through them. The present disclosure provides embodiments where a TVS or SIDAC is used with the solenoid or trip coil of the GFCI as the current limiting component.

Nominal voltage for both TVS and SIDACs has to be selected to be above (or close to maximum) peak voltage applied to the circuit interrupter during abnormal overvoltage. Therefore, TVS or SIDAC devices with nominal voltage of 350V/400V are preferable. Additionally, because of the nature of TVS and SIDAC devices of clamping voltage faster than MOV and because current through these devices is limited by the trip coil of the GFCI, the maximum voltage applied to the device electronics is limited to 400V-500V (depending on the semiconductor device used).

A preferred TVS diode for protection of a circuit interrupter, such as a GFCI product, is the SMBJ350CA manufactured by Littelfuse, Inc., Chicago, Ill. A preferred SIDAC for protection of a circuit interrupter is the SIDACtor P350SCMCLRP also manufactured by Littelfuse, Inc.

In particular, in one embodiment according to the present disclosure, there is provided a circuit interrupter having a housing; at least one input conductor disposed at least partially within the housing and capable of being electrically connected to a source of electricity; at least one output conductor disposed within the housing and capable of conducting electrical current to a load when electrically connected to said at least one input conductor; and circuit interrupter circuitry disposed within the housing and configured to break the electrical connection between the input and output conductors in response to the occurrence of a ground fault or test cycle. The circuit interrupter circuitry includes a solenoid coil. The circuit interrupter further has a surge protection circuit having a semiconductor device for reducing surge voltage applied to the circuit interrupter circuitry. The solenoid coil limits the current through the semiconductor device.

In an alternate embodiment, the circuit interrupter includes a reset mechanism is provided and is configured to reset the electrical connection between the input and output conductors when the reset mechanism is activated.

DETAILED DESCRIPTION OF THE PREFERRED EMBODIMENTS

A circuit interrupter having improved transient and overvoltage suppression is described. The commonly owned U.S. patents referred to above describe circuit interrupting devices and are incorporated herein in their entirety by reference. For example, U.S. Pat. No. 7,049,910 describes a circuit interrupting device having a reset mechanism with a reset lockout portion. The reset lockout portion prevents the reestablishing of electrical continuity in open conductive paths if the circuit interrupting portion is non-operational, if an open neutral condition exists or if the device is reverse wired. The circuit interrupter can be a GFCI and/or other related product having a circuit interrupter, such as an AFCI and a fuse, event though the present disclosure refers mainly to a GFCI product.

The GFCI and/or related products, such as an AFCI, in accordance with the present disclosure include a suppression and protection circuit which interfaces between power inputs and a ground fault circuit interrupter (GFCI) circuit connected to a load. The GFCI and/or related products can also include a reset mechanism with a reset lockout portion. The suppression and protection circuit providing enhanced suppression of transient surges for the circuit interrupter as well as protection from overvoltage conditions, while the circuit interrupter is operational. The suppression and protection circuit 10 includes an overvoltage prevention circuit having a surge protector or voltage clamping device, such as a metal oxide varistor (MOV), and a semiconductor protection device, such as, for example, a TVS diode or a SIDAC (Silicon Diode for Alternating Current) marketed, for example, under the names SIDACtor, Transit or TSPD. The suppression and protection circuit is described in greater detail with reference to embodiments shown by FIGS. 1-4.

Figure 1:
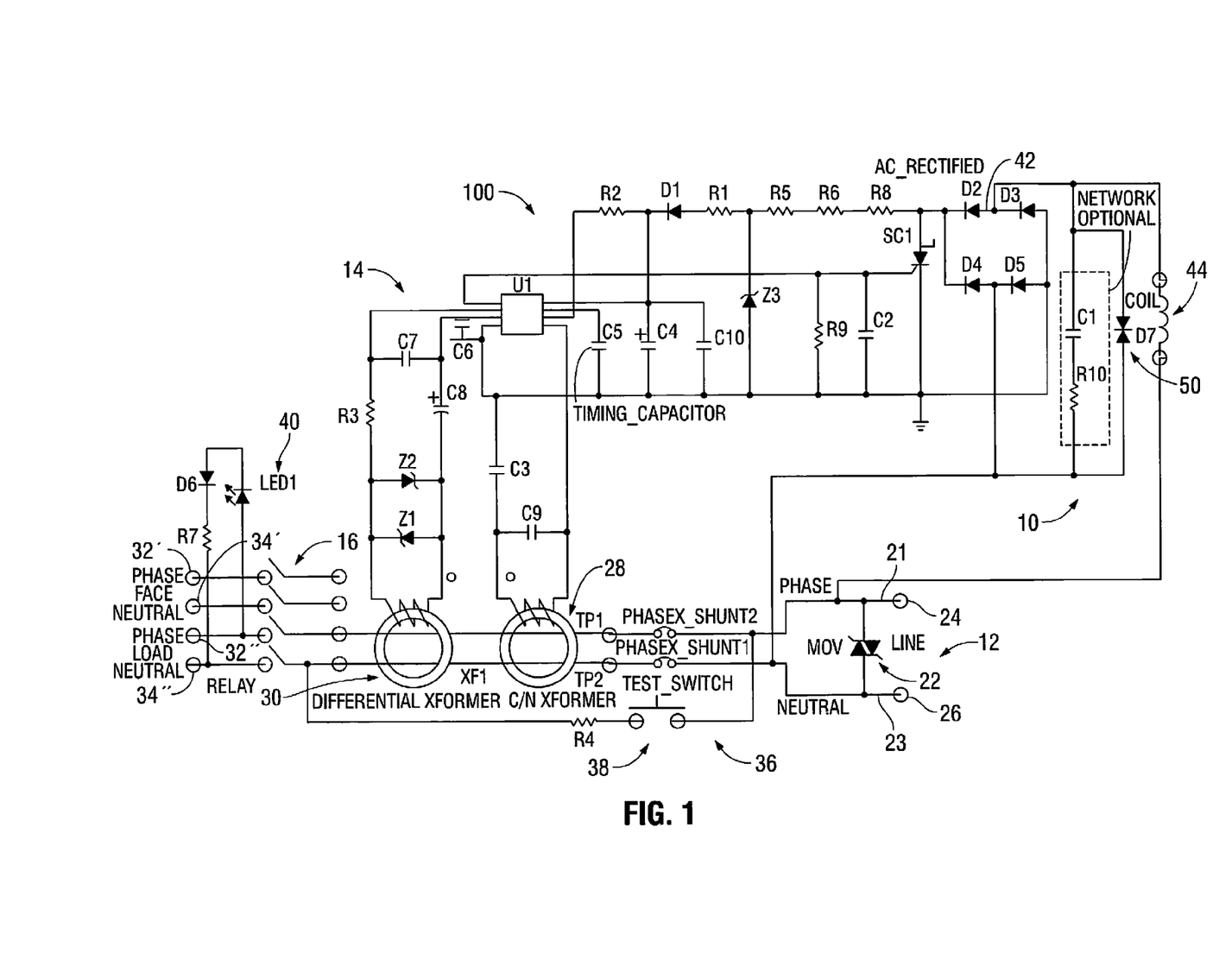
FIG. 1 illustrates a schematic diagram of a GFCI circuit having a suppression and protection circuit and a TVS diode according to a first embodiment of the present disclosure.

FIG. 1 illustrates one example embodiment of the suppression and protection circuit 10 and an interrupter or GFCI circuit 14 forming a GFCI product 100. The circuit 10 includes an MOV 22 positioned between input power lines as the power inputs 12, for example, an alternating current (AC) line connection having a phase line 24 and a neutral line 26. The lines 24, 26 are connected to phase line and neutral line conductors 21, 23 of the GFCI 100.

The lines 24, 26 are also connected through the MOV 22 and through a ground neutral transformer 28 and a differential or sensing transformer 30 to the load 16, which may include two phase load connections 32' and 32" and two neutral load connections 34' and 34". A test line 36 may also be provided in a manner known in the art including, for example, a test switch 38 and a resistor R4 having a 15 KOhms resistance. Optionally, a relay 40 and/or circuit breaker known in the art may be provided, as further described herein, connecting the differential transformer 30 to the load lines 32', 32", 34' and 34".

A processor U1 of the GFCI circuit 14 is connected via a plurality of pins or connectors to the transformers 28, 30 in a manner known in the art, for example, using capacitors C3 and C6-C9, resistor R4, and diodes Z1, Z2. In the example embodiment shown in FIG. 1, the resistor R3 has a 100 ohm resistance, and the capacitors C3 and C6-C9 have capacitances of 0.01 µF, 100 pF, 0.0033 µF, 10 µF, and 100 pF, respectively, each having a voltage rating of 50 V, except for the capacitor C8 having a voltage rating of 6.3 V.

The processor U1 may be, for example, a model LM1851 ground fault interrupter controller commercially available from "NATIONAL SEMICONDUCTOR", capable of providing ground fault protection for AC power outlets in consumer and industrial environments. The processor U1 is also connected via its pins/connectors to the MOV 22 in a manner known in the art, for example, using capacitors C10, C4 and C5 having capacitances of 0.01 µF, 1 µF, and 0.018 µF, respectively, at 50 V; a capacitor C2 having a 680 pF capacitance at 500 V; resistors R1 and R2 having 15 kohms and 2 Mohms resistances, respectively; a diode D1; a rectifier SC1 such as a silicon controlled rectifier (SCR); and a set of diodes D2-D5 forming a bridge diode circuit or configuration 42, as shown in FIG. 1.

The circuit 10 further includes a semiconductor protection device 50, such as a SIDAC D7 shown in FIG. 1 connected to the bridge diode circuit 42 and to the neutral line 26. An optional snubber circuit (C1, R10) 52 may be connected in parallel to the semiconductor protection device 50. The snubber circuit 52 can be used in addition to the described protection device 50 to improve the noise immunity by eliminating noise.

In the example embodiment shown by FIG. 1, the MOV 22 and the semiconductor protection device 50 are connected to an inductor 44. The inductor 44 may be a solenoid coil or bobbin acting as a trip coil, such that the inductor 44 also functions as an actuator to disengage the relay mechanism 40 on the load side. More specifically, the MOV 22 provides primary protection against overvoltage conditions on the power line and the semiconductor protection device 50 provides secondary and faster protection. The inductor 44 or trip coil is used as a voltage dropping component or resistive component which is necessary for operation of the semiconductor protection device 50.

In the embodiment shown in FIG. 1, the MOV 22 clamps the voltage exposed to the capacitor C1 to be within the voltage rating of the capacitor C1, for example, 400 V. As in the prior art, the MOV 22 itself in a GFCI product is capable of handling transient surges and overvoltage conditions of, for example, less than 2-6 kV at 3 kA surge. Using the semiconductor protection device 50 in the disclosed suppression and protection circuit 10, transient voltages exceeding, for example, 2 kV at 3 kA and even 6 kV at 3 kA, are suppressed. Accordingly, the MOV 22 in the GFCI product is capable of handling voltages exceeding a root-mean-square (RMS) voltage rating of the MOV 22, permitting the MOV 22 to survive and provide primary protection from other transient, surge, and overvoltage conditions, as described herein.

During operation, the MOV 22 performs the functions of clamping and passing surge current through its terminals, thereby protecting the rest of the circuit interrupter circuitry. However, the MOV 22 reacts too slowly to the overvoltage condition compared to the semiconductor protection device 50. Therefore, at the beginning of the surge pulse, the voltage applied to the circuit interrupter circuitry may reach 800V or more causing the destruction of the GFCI product without the use of the device 50. The semiconductor protection device 50 provides secondary protection to prevent the destruction of the GFCI product. The device 50 performs the function of clamping the excess voltage much faster compared with the MOV 22, such that the GFCI product gets exposed voltage drops below 400-500V. The inductor 44 or trip coil is used as a resistive component to perform the functions of dropping the excess voltage and limiting current through the semiconductor protection device 50. In this manner, the surge suppression and overvoltage protection of a GFCI product which includes the circuit 10 and the GFCI circuit 14 is significantly improved.

Figure 2:
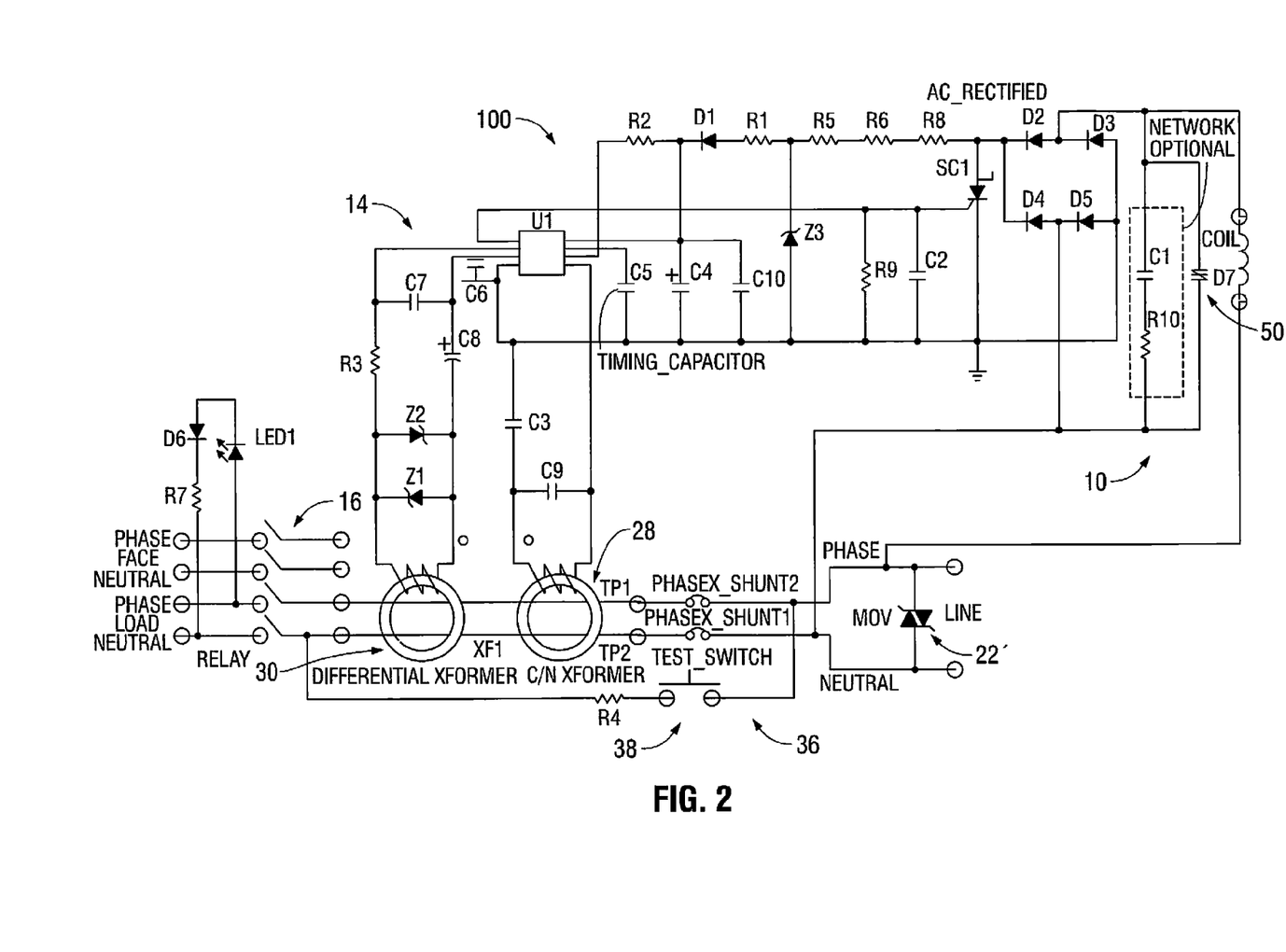
FIG. 2 illustrates a schematic diagram of a GFCI circuit having a suppression and protection circuit and a SIDAC according to a second embodiment of the present disclosure.
Figure 3:
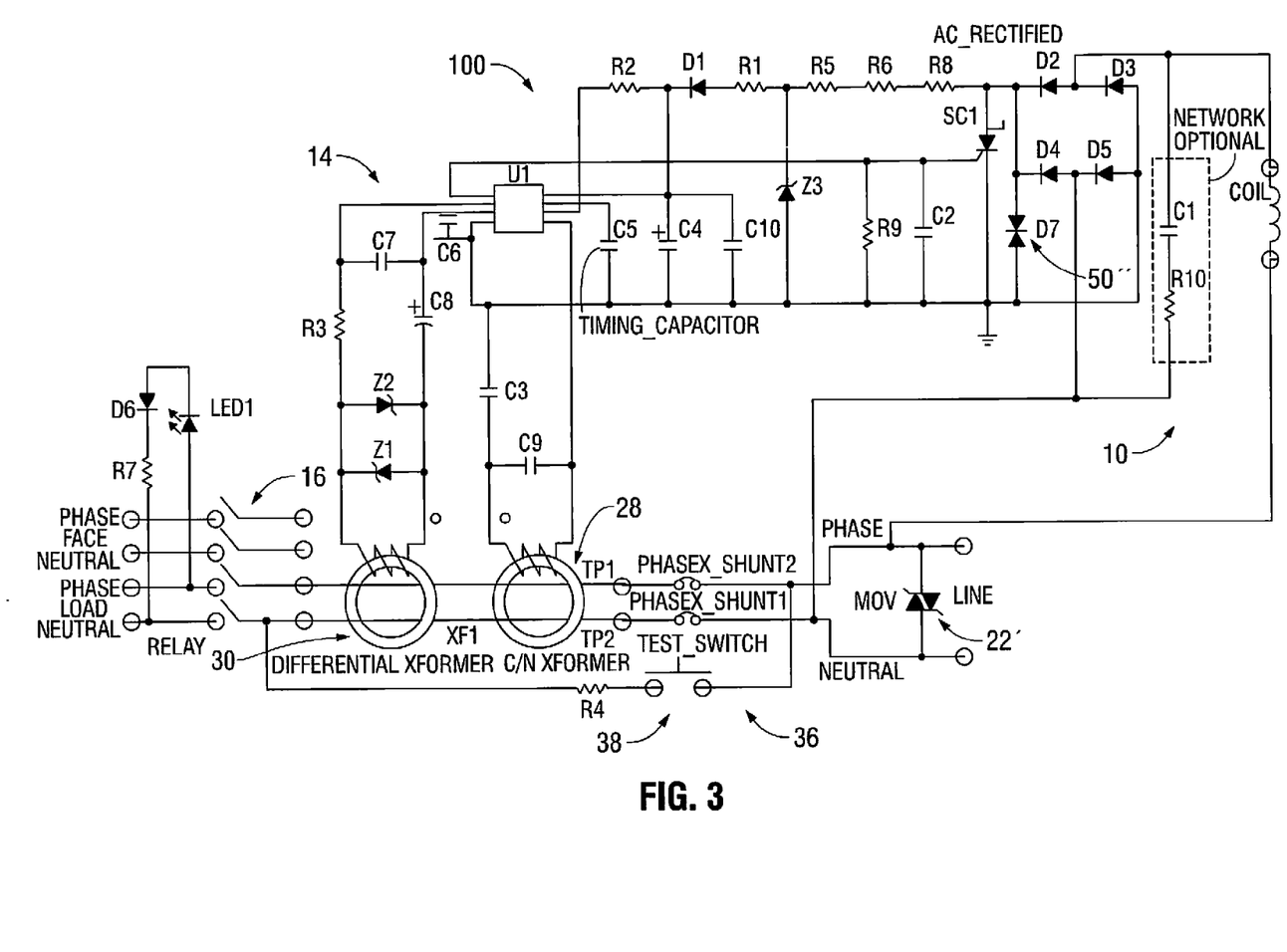
FIG. 3 illustrates a schematic diagram of a GFCI circuit having a suppression and protection circuit and a TVS diode according to a third embodiment of the present disclosure.
Figure 4:
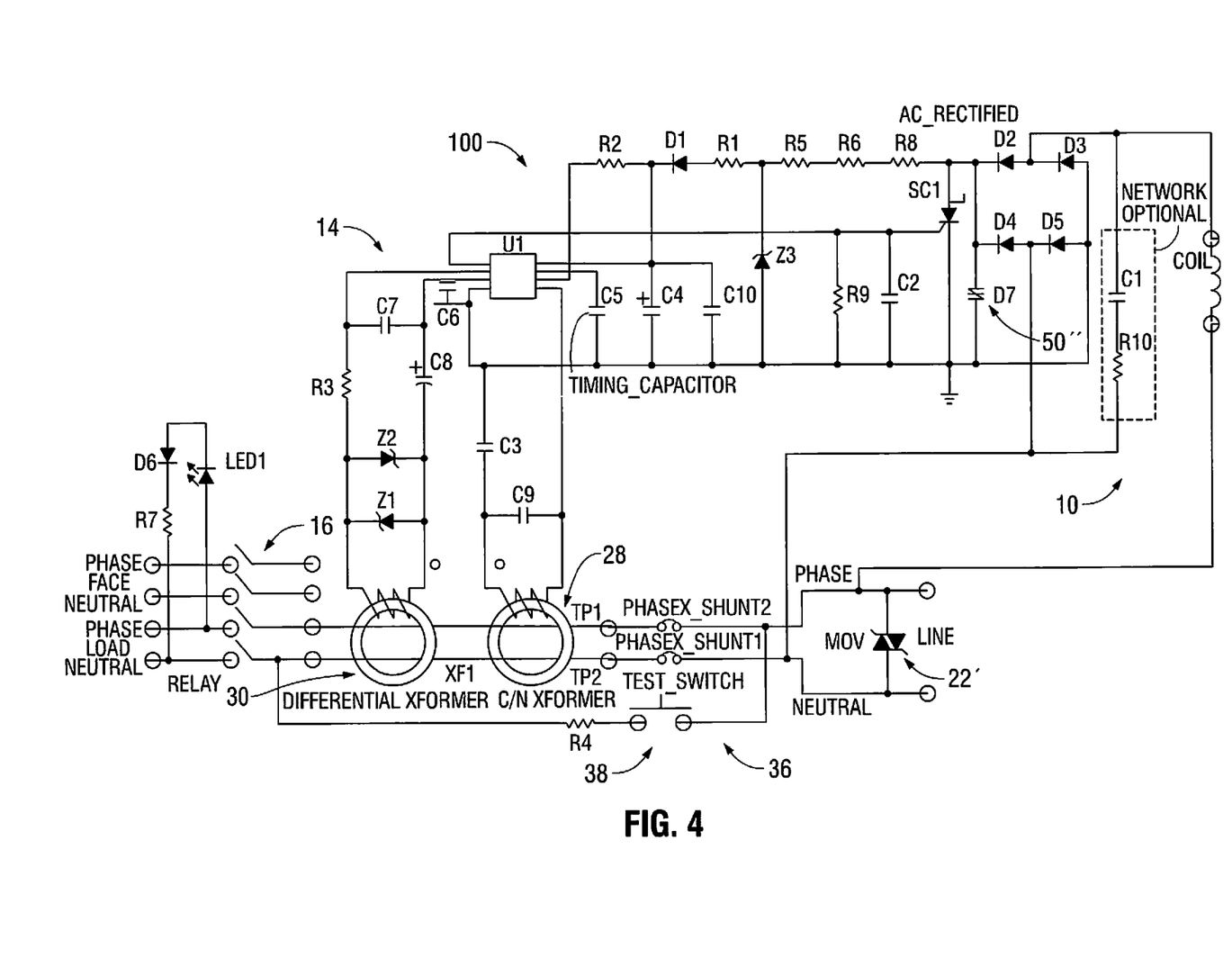
FIG. 4 illustrates a schematic diagram of a GFCI circuit having a suppression and protection circuit and a SIDAC according to a fourth embodiment of the present disclosure.

Referring to FIGS. 2-4, other sample embodiments of other GFCI products in accordance with the present disclosure are described. The operation and functions of the MOVs 22', 22" and 22'" and the operation and functions of the semiconductor protection devices 50', 50" and 50'" are similar, if not identical, to the operation and functions of the MOV 22 and semiconductor protection device 50, respectively. In FIG. 2, the GFCI product 100' is similar to the GFCI product 100 except for including a TVS D7' as the semiconductor protection device 50'. The MOV 22' is a variable resistance that may have an effect as voltage changes.

In FIG. 3, as in the first embodiment shown by FIG. 1, the GFCI product 100" includes a semiconductor protection device 50" which is a SIDAC D7". The device 50" is connected to the bridge diode circuit 42 and to ground. The MOV 22" is a variable resistance that may have an effect as voltage changes.

In FIG. 4, as in the second embodiment shown by FIG. 2, the semiconductor protection device 50'" is a TVS D7'". The device 50'" is connected to the bridge diode circuit 42 and to ground. The MOV 22" is a variable resistance that may have an effect as voltage changes.

TVS diodes and SIDAC are manufactured in small SMT packages (SMA (400 W) and SMB (600 W)). This allows MOV miniaturization to create semiconductor protection devices in small housings capable of fitting into a standard wall box.

Voltage clamping devices include without limitation selenium cells, Zener diodes, silicon carbide varistors and metal oxide varistors (MOVs).

Additionally, it is known in the art to provide a visual indication that a device equipped with surge suppression is still operating with surge suppression capability. In an embodiment of the present invention, a visual indicator is provided to indicate that the device is operating with adequate surge suppression capability. Similarly, an alarm such as an audio indicator may be provided to indicate that the device is no longer operating with adequate surge suppression capabilities.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed is:

1. A circuit interrupter comprising:
  a housing;
  at least one input conductor disposed at least partially within said housing and capable of being electrically connected to a source of electricity;
  at least one output conductor disposed within said housing and capable of conducting electrical current to a load when electrically connected to said at least one input conductor;
  circuit interrupter circuitry disposed within said housing and configured to break said electrical connection between said input and output conductors in response to the occurrence of a fault or test cycle, said circuit interrupter circuitry including a solenoid coil;
  a reset mechanism configured to reset said electrical connection between said input and output conductors when said reset mechanism is activated; and
  a surge protection circuit comprising a semiconductor device for reducing surge voltage applied to said circuit interrupter circuitry, wherein said solenoid coil limits the current through said semiconductor device and said semiconductor device is a transient voltage suppression (TVS) diode.

2. The circuit interrupter of claim 1, wherein the surge protection circuit further comprising a surge protector coupled between phase and neutral conductors of the circuit interrupter.

3. The circuit interrupter of claim 2, wherein the surge protector coupled between phase and neutral conductors of the circuit interrupter comprises a metal oxide varistor (MOV) to shunt over voltage between the phase and neutral conductors.

4. The circuit interrupter of claim 1, wherein the semiconductor device is connected directly to the solenoid coil.

5. The circuit interrupter of claim 1, wherein the semiconductor device is connected to the solenoid coil via a bridge diode circuit, and wherein the solenoid coil is a trip coil functioning as a voltage dropping component.

6. The circuit interrupter of claim 1, wherein the semiconductor device is connected to the neutral conductor of the circuit interrupter.

7. The circuit interrupter of claim 1, wherein the semiconductor device is connected in parallel to an RC circuit for improving noise elimination.

8. The circuit interrupter of claim 1, wherein the circuit interrupter is selected from the group consisting of a GFCI, an AFCI, and a fuse.

9. The circuit interrupter of claim 1, wherein said reset mechanism has a reset lock-out responsive to the activation of said circuit interrupter so as to be movable between a lock-out position wherein said reset lock-out inhibits resetting of said electrical connection between said input and output conductors and a reset position wherein said reset lock-out does not inhibit resetting of said electrical connection between said input and output conductors, wherein when said reset mechanism is activated said circuit interrupter is activated to facilitate movement of said reset lock-out from said lock-out position to said reset position by said reset mechanism and resets said electrical connection between said input and output conductors.

10. The circuit interrupter of claim 1, wherein the fault is one of a ground fault and an arc fault.

11. A circuit interrupter comprising:
a housing;
at least one input conductor disposed at least partially within said housing and capable of being electrically connected to a source of electricity;
at least one output conductor disposed within said housing and capable of conducting electrical current to a load when electrically connected to said at least one input conductor;
circuit interrupter circuitry disposed within said housing and configured to break said electrical connection between said input and output conductors in response to the occurrence of a fault or test cycle, said circuit interrupter circuitry including a solenoid coil; and
a surge protection circuit comprising a semiconductor device for reducing surge voltage applied to said circuit interrupter circuitry, wherein said solenoid coil of the circuit interrupter circuitry limits the current through said semiconductor device and said semiconductor device is a transient voltage suppression (TVS) diode.

12. The circuit interrupter of claim 11, wherein the surge protection circuit further comprising a surge protector coupled between phase and neutral conductors of the circuit interrupter.

13. The circuit interrupter of claim 12, wherein the surge protector coupled between phase and neutral conductors of the circuit interrupter comprises a metal oxide varistor (MOV) to shunt over voltage between the phase and neutral conductors.

14. The circuit interrupter of claim 11, wherein the semiconductor device is connected directly to the solenoid coil, and wherein the solenoid coil is a trip coil functioning as a voltage dropping component.

15. The circuit interrupter of claim 11, wherein the semiconductor device is connected to the solenoid coil via a bridge diode circuit.

16. The circuit interrupter of claim 11, wherein the semiconductor device is connected to the neutral conductor of the circuit interrupter.

17. The circuit interrupter of claim 11, wherein the semiconductor device is connected in parallel to an RC circuit for improving noise elimination.

18. The circuit interrupter of claim 11, wherein the circuit interrupter is selected from the group consisting of a GFCI, an AFCI, and a fuse.

19. The circuit interrupter of claim 11, wherein the fault is one of a ground fault and an arc fault.

20. A circuit interrupter comprising:
a housing;
an input comprising at least one phase input and one neutral input conductor disposed at least partially within said housing and capable of being electrically connected to a source of electricity;
an output comprising at least one phase output and one neutral output conductor disposed within said housing and capable of conducting electrical current to a load when electrically connected to said phase input and said neutral input conductors, respectively;
circuit interrupter circuitry disposed within said housing and configured to break said electrical connection between said input and said output in response to the occurrence of a fault or test cycle, said circuit interrupter circuitry including a solenoid coil;
a reset mechanism configured to reset said electrical connection between said input and said output when said reset mechanism is activated; and
a surge protection circuit disposed in electrical communication between said at least one input and said circuit interrupter circuitry, said surge protection circuit comprising a metal oxide varistor (MOV) and a semiconductor device, wherein said MOV is coupled between said phase input and said neutral input, wherein said semiconductor device is arranged and configured to reduce surge voltage applied to said circuit interrupter circuitry, and wherein said solenoid coil limits the current through said semiconductor device.

21. The circuit interrupter of claim 20, wherein the semiconductor device is selected from the group consisting of a SIDAC and a TVS diode.

22. The circuit interrupter of claim 20, wherein the semiconductor device is connected directly to the solenoid coil.

23. The circuit interrupter of claim 20, wherein the semiconductor device is connected to the solenoid coil via a bridge diode circuit, and wherein the solenoid coil is a trip coil functioning as a voltage dropping component.

24. The circuit interrupter of claim 20, wherein the semiconductor device is connected to the one neutral input conductor of the circuit interrupter.

25. The circuit interrupter of claim 20, wherein the semiconductor device is connected in parallel to an RC circuit for improving noise elimination.

26. The circuit interrupter of claim 20, wherein the circuit interrupter is selected from the group consisting of a GFCI, an AFCI, and a fuse.

27. The circuit interrupter of claim 20, wherein said reset mechanism has a reset lock-out responsive to the activation of said circuit interrupter so as to be movable between a lock-out position wherein said reset lock-out inhibits resetting of said electrical connection between said input and output and a reset position wherein said reset lock-out does not inhibit resetting of said electrical connection between said input and output, wherein when said reset mechanism is activated said circuit interrupter is activated to facilitate movement of said reset lock-out from said lock-out position to said reset position by said reset mechanism and resets said electrical connection between said input and output.

28. The circuit interrupter of claim 20, wherein the fault is one of a ground fault and an arc fault.

29. A circuit interrupter comprising:
a housing;
at least one input conductor disposed at least partially within said housing and capable of being electrically connected to a source of electricity;
at least one output conductor disposed within said housing and capable of conducting electrical current to a load when electrically connected to said at least one input conductor;
circuit interrupter circuitry disposed within said housing and configured to break said electrical connection between said input and output conductors in response to the occurrence of a fault or test cycle, said circuit interrupter circuitry including a solenoid coil;
a reset mechanism configured to reset said electrical connection between said input and output conductors when said reset mechanism is activated; and
a surge protection circuit comprising a metal oxide varistor (MOV) and a semiconductor device, wherein said semiconductor device is arranged and configured to reduce surge voltage applied to said circuit interrupter circuitry, wherein said solenoid coil limits the current through said semiconductor device, and wherein said semiconductor device is a SIDAC having a voltage equal to or greater than a voltage of the MOV.

30. The circuit interrupter of claim 29, wherein the MOV is coupled between phase and neutral conductors of the circuit interrupter.

31. The circuit interrupter of claim 30, wherein the MOV shunts over voltage between the phase and neutral conductors.

32. The circuit interrupter of claim 29, wherein the semiconductor device is connected directly to the solenoid coil.

33. The circuit interrupter of claim 29, wherein the semiconductor device is connected to the solenoid coil via a bridge diode circuit, and wherein the solenoid coil is a trip coil functioning as a voltage dropping component.

34. The circuit interrupter of claim 29, wherein the semiconductor device is connected to the neutral conductor of the circuit interrupter.

35. The circuit interrupter of claim 29, wherein the semiconductor device is connected in parallel to an RC circuit for improving noise elimination.

36. The circuit interrupter of claim 29, wherein the circuit interrupter is selected from the group consisting of a GFCI, an AFCI, and a fuse.

37. The circuit interrupter of claim 29, wherein said reset mechanism has a reset lock-out responsive to the activation of said circuit interrupter so as to be movable between a lock-out position wherein said reset lock-out inhibits resetting of said electrical connection between said input and output conductors and a reset position wherein said reset lock-out does not inhibit resetting of said electrical connection between said input and output conductors, wherein when said reset mechanism is activated said circuit interrupter is activated to facilitate movement of said reset lock-out from said lock-out position to said reset position by said reset mechanism and resets said electrical connection between said input and output conductors.

38. The circuit interrupter of claim 29, wherein the fault is one of a ground fault and an arc fault.

* * * * *